April 5, 1927.  1,623,840
C. KASSY
CHICKEN FEEDER
Filed Jan. 13, 1926
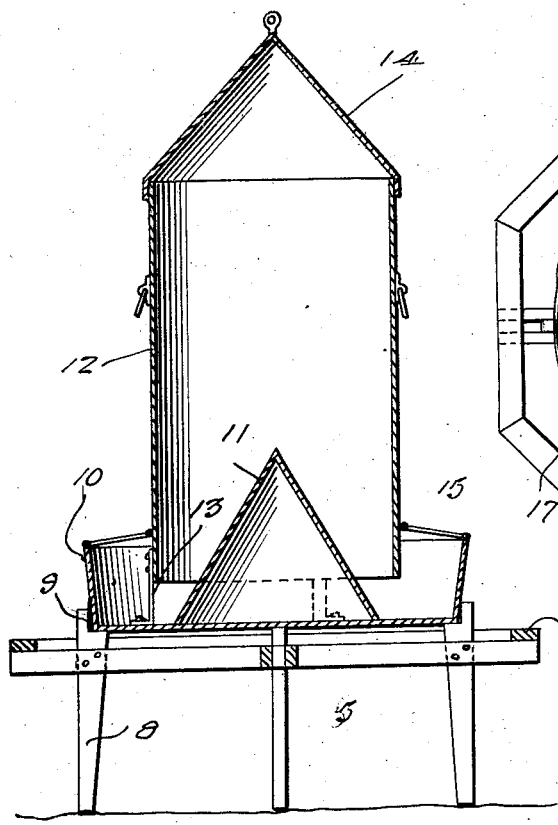
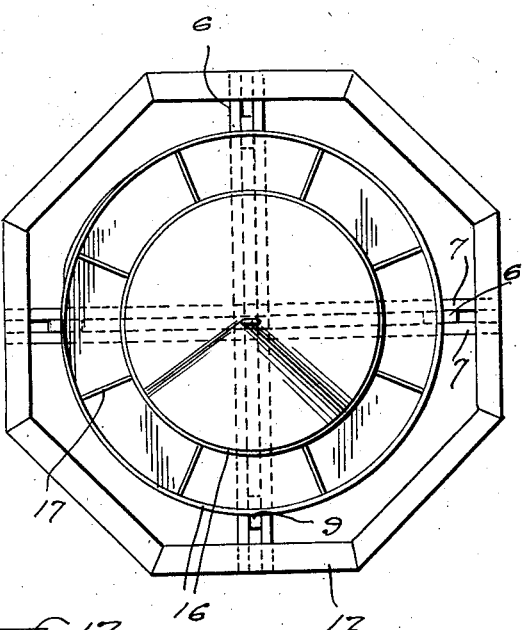
Inventor
C. Kassy
By Clarence A O'Brien
Attorney Patented Apr. 5, 1927.

1,623,840

UNITED STATES PATENT OFFICE.

CHARLES KASSY, OF WEST NEWTON, PENNSYLVANIA.

CHICKEN FEEDER.

Application filed January 13, 1926. Serial No. 80,991.

This invention relates to chicken feeders and for its primary object to provide such a device wherein practically all waste in the feeding of chickens is eliminated and wherein the feed trough is automatically maintained in a relatively filled condition as long as the main supply of feed is not entirely dissipated.

A further and important object is to provide a feeder of the beforementioned character that may be readily knocked down for cleaning, repair, or the renewal purposes, and also for permitting the easy transportation of the same.

With the foregoing and other objects in view as the nature of the invention is better understood, the same comprises the novel form, combination and arrangement of parts as hereinafter set forth in the following description and claimed.

In the drawings forming part of this application, and in which like numerals indicate corresponding parts throughout the several views:—

Figure 1 is a detail vertical section of a chicken feeder constructed in accordance with the present invention, and Fig. 2 is a top plan view thereof.

Now having particular reference to the drawings, my novel feeder constitutes the provision of a stand designated generally by the numeral 5 that consists of a pair of cross members 6—6 each of which includes a pair of spaced parallel bars 7—7, between which, adjacent the outer ends thereof are secured slightly inclined vertical supporting legs 8, the upper ends of which are rabbeted as at 9 for providing a means for support of a pan-shaped trough 10 and for preventing longitudinal movement of the trough upon the support.

Secured to the outer ends of the cross members 6—6 and to each other in any desirable manner are board lengths 11 providing a generally circular roost for the chickens.

The feeder per se constitutes the provision of said pan-shaped trough 10 within the center of which is disposed a vertically extending conical-shaped distributor 11. Adapted to be disposed over said feed distributor 11 within the pan 10 and in spaced relation with the bottom wall thereof is a cylindrical hopper 12' open at its opposite ends. The lower open end of said hopper is provided with a plurality of pendant metallic legs 13 that may be and preferably are secured at their lower ends to the bottom wall of the pan-shaped trough 10, it being noted that the lower open end of the hopper is disposed within the trough intermediate the side wall thereof and the distributor 11, for thus providing a diametric feed between the hopper and the pan 12' and 10 respectively for providing constant supply of the feed as long as the supply of feed within the hopper is not entirely depleted.

The upper end of the hopper 12 may be and preferably is provided with a suitable form of closure lid 14.

Adapted to be disposed around the pan-shaped trough 10 between the upper edge thereof and the wall of the hopper 12' is an individual trough providing member 15 consisting of a pair of concentrically arranged wire rings 16—16 that are interconnected by spaced cross wires 17.

It will thus be seen that I provide a highly novel, simple and efficient form of feeder which is well adapted for all of the purposes heretofore designated. Even though I have herein shown and described the most preferred embodiment of the invention with which I am at this time familiar, it will thus be understood that minor changes may be made therein.

Having thus described my invention, what I claim as new and desire to secure by Letters Patent is:

A chicken feeder of the class described comprising a stand including a pair of cross members, each of which includes a pair of spaced parallel bars, vertically arranged supporting legs secured between the spaced bars of each cross member, the upper ends of said supporting legs extending above the cross bars and being rabbeted, a pan shaped trough supported on the rabbeted portions of said supporting legs, a feed distributor cone disposed vertically within the trough and extending upwardly therefrom, an open ended hopper disposed within the trough around the cone and spaced from the bottom wall of the trough, and a perch extending around the outer ends of the cross members and secured thereon.

In testimony whereof I affix my signature.

CHARLES KASSY.